(12) United States Patent
Lim et al.

(10) Patent No.: US 9,958,581 B2
(45) Date of Patent: May 1, 2018

(54) COMPLEX THREE-DIMENSIONAL MULTI-LAYER STRUCTURE AND MANUFACTURING METHOD THEREOF

(71) Applicant: Minuta Technology Co., LTD, Gyeonggi-do (KR)

(72) Inventors: Han Eol Lim, Gyeonggi-do (KR); Se Jin Choi, Gyeonggi-do (KR); Tae Wan Kim, Gyeonggi-do (KR); Seung Joon Baek, Gyeonggi-do (KR)

(73) Assignee: Minuta Technology Co., LTD, Osan-si, Gyeonggi-do (KR)

( * ) Notice: Subject to any disclaimer, the term of this patent is extended or adjusted under 35 U.S.C. 154(b) by 329 days.

(21) Appl. No.: 14/410,266

(22) PCT Filed: Jun. 13, 2013

(86) PCT No.: PCT/KR2013/005213
§ 371 (c)(1),
(2) Date: Mar. 16, 2015

(87) PCT Pub. No.: WO2013/191412
PCT Pub. Date: Dec. 27, 2013

(65) Prior Publication Data
US 2015/0323712 A1    Nov. 12, 2015

(30) Foreign Application Priority Data

Jun. 21, 2012 (KR) .................... 10-2012-0067048
Aug. 31, 2012 (KR) .................... 10-2012-0096320

(51) Int. Cl.
*G02B 5/02* (2006.01)
*G02B 5/04* (2006.01)
(Continued)

(52) U.S. Cl.
CPC ............ *G02B 5/04* (2013.01); *B29C 59/16* (2013.01); *B32B 3/30* (2013.01); *G02B 5/02* (2013.01);
(Continued)

(58) Field of Classification Search
CPC ....... Y10T 428/2457; Y10T 428/24174; Y10T 428/24479; Y10T 428/24612; B32B 3/30;
(Continued)

(56) References Cited

U.S. PATENT DOCUMENTS

2003/0133301 A1* 7/2003 Mullen ............... F21V 5/002
362/332
2005/0141090 A1* 6/2005 Huang ............... G02B 3/0037
359/485.01
2010/0295762 A1* 11/2010 Yeom ............... G02B 5/0231
345/87

FOREIGN PATENT DOCUMENTS

KR    1020030091901 A    12/2003
KR    1020090043958 A    5/2009
(Continued)

Primary Examiner — Donald J Loney
(74) Attorney, Agent, or Firm — Christensen, Fonder, Dardi & Herbert PLLC; Peter S. Dardi

(57) ABSTRACT

The present invention relates to a 3-dimensional complex multilayer structure. The 3-dimensional complex multilayer structure includes a first pattern and a second pattern having different thicknesses formed on one or both surfaces of a plate. The first pattern is selected from the group consisting of parallel lines, parallel curves, parallel zigzag lines, and combinations thereof which do not meet each other. The second pattern is not parallel to the first pattern and is selected from the group consisting of parallel lines, parallel curves, parallel zigzag lines, and combinations thereof which do not meet each other. The interfaces between the first pattern and the second pattern form figures selected from the group consisting of polygons, circles, ellipses, and (Continued)

combinations thereof. The figures are repetitively formed on one or both surfaces of the plate. The 3-dimensional complex multilayer structure includes different complex patterns, whereas a conventional device has a kind of simple pattern. The 3-dimensional complex multilayer structure of the present invention can be manufactured by a simple process. Therefore, the 3-dimensional complex multilayer structure of the present invention can find application in various fields, including optical components for displays (e.g., light guide plates, diffusion plates, prisms, and color filters), next generation displays and display devices (e.g., TFTs, OTFTs, oxide TFTs, flexible displays, and transparent displays), next generation 3-dimensional semiconductors, dry adhesion based on the use of fine ciliary structures, micro/nano piezoelectric devices, lighting optical components, and biocell/virus research using micropatterns.

10 Claims, 17 Drawing Sheets

(51) Int. Cl.
| | |
|---|---|
| *F21V 8/00* | (2006.01) |
| *B29C 59/16* | (2006.01) |
| *B32B 3/30* | (2006.01) |
| *G02B 5/20* | (2006.01) |
| *G02B 6/00* | (2006.01) |
| *G02B 6/12* | (2006.01) |
| *B29D 11/00* | (2006.01) |
| *B29L 11/00* | (2006.01) |

(52) U.S. Cl.
CPC ............. *G02B 5/0263* (2013.01); *G02B 5/20* (2013.01); *G02B 6/00* (2013.01); *G02B 6/0058* (2013.01); *G02B 6/12* (2013.01); *B29D 11/00865* (2013.01); *B29L 2011/00* (2013.01); *G02B 5/0231* (2013.01); *G02B 5/045* (2013.01); *Y10T 428/2457* (2015.01); *Y10T 428/24174* (2015.01); *Y10T 428/24479* (2015.01); *Y10T 428/24612* (2015.01)

(58) Field of Classification Search
CPC .......... G02B 5/0263; G02B 5/20; G02B 5/04; G02B 5/02; G02B 6/12; G02B 6/0058; G02B 6/00; G02B 5/0231; G02B 5/045; B29L 2001/00
See application file for complete search history.

(56) References Cited

FOREIGN PATENT DOCUMENTS

| KR | 1020090073532 A | 7/2009 |
|---|---|---|
| KR | 1020100057313 | 5/2010 |
| KR | 1020110017194 | 2/2011 |
| KR | 1020120063184 | 6/2012 |

* cited by examiner

COMPLEX THREE-DIMENSIONAL MULTI-LAYER STRUCTURE AND MANUFACTURING METHOD THEREOF

This application is a national stage filing of PCT Application No. PCT/KR2013/005213 to LIM et al., filed Jun. 13, 2013, entitled "COMPLEX THREE-DIMENSIONAL MULTI-LAYER STRUCTURE AND MANUFACTURING METHOD THEREOF," which claims priority to Korean Patent Application Nos. 10-2012-0067048 filed on Jun. 21, 2012 and 10-2012-0096320 filed on Aug. 31, 2012, all of which are incorporated herein by reference.

BACKGROUND OF THE INVENTION

1. Field of the Invention

The present invention relates to a 3-dimensional complex multilayer structure. More specifically, the present invention relates to a 3-dimensional complex multilayer structure having a complex shape that can be used in a wide variety of fields, including optics, measuring instruments, integrated circuits, and other microdevices, and a method for manufacturing the multilayer structure.

2. Description of the Related Art

With the recent technological developments in the fields of optics, measuring instruments, integrated circuits, and other microdevices, a great deal of research has been conducted on micro/nano-sized structures having complex 3-dimensional shapes that can find application in various fields, including optical components, next generation 3-dimensional semiconductors, next generation displays (such as TFT backplanes, flexible TFTs, and transparent displays), dry adhesion based on the use of fine ciliary structures, micro/nano piezoelectric devices, lighting devices, and bio-cell/virus research using micropatterns.

In recent years, optical components other than cathode ray tubes have been employed to develop flat panel displays with reduced weight and volume. Such flat panel displays are, for example, liquid crystal displays (LCDs), field emission displays (FEDs), plasma display panels (PDPs), and electroluminescence (EL) displays. Considerable research efforts have been directed towards the development of large-screen flat panel displays with improved display quality.

Particularly, liquid crystal displays (LCDs) are flat panel displays that possess the advantages of small size, light weight, and low power consumption. Due to these advantages, the use of liquid crystal displays is steadily on the rise. Liquid crystal displays refer to non-emissive displays that display information taking advantage of the electrical/optical properties of liquid crystal materials injected into liquid display panels and display images using light sources such as lamps. Liquid crystal materials injected between TFT substrates and color filter substrates of liquid crystal displays are non-emissive materials that control the amount of light entering from the outside to display images on screens, unlike self-emissive cathode ray tubes. Thus, backlight assemblies as separate devices for irradiating light onto liquid display panels are inevitably required in liquid crystal displays.

A backlight assembly includes a mold frame having an receiving space formed therein, a reflective sheet disposed at the bottom of the receiving space to reflect light toward a liquid display panel, a light guide plate or diffusion plate disposed on the surface of the reflective sheet to guide light, a lamp unit mounted between the light guide plate and the side wall of the receiving space or at the bottom of the receiving space to emit light, optical sheets stacked on the surface of the light guide plate to diffuse and collect light, and a top chassis mounted on top of the mold frame to cover an area ranging from an edge portion of the liquid crystal display panel to a lateral side of the mold frame.

The light guide plate or the diffusion plate suffers from the disadvantage of very low exit angle or front luminance, which increases the number of the optical sheets stacked thereon.

The optical sheets consist of a plurality of sheets, including a diffusion sheet adapted to diffuse light, a prism sheet stacked on the diffusion sheet to focus the diffused light on the liquid crystal display panel, and a protective sheet adapted to protect the diffusion sheet and the prism sheet.

As described above, optical sheets used in displays are large in number and are expensive. Thus, a reduction in the number of optical sheets used in displays is considered a major technical issue. Many efforts have been made to reduce the number of optical sheets. For example, a diffusion sheet and a prism sheet may be replaced by a single optical sheet. In this case, the optical sheet is required to have the functions of both the diffusion sheet and the prism sheet and should exhibit performance comparable to a plurality of optical sheets.

Further, the single optical sheet should maintain the quality of images on a display obtained by the use of a plurality of optical sheets. In the literature, techniques are known that allow a single optical sheet to have combined functions, as described above. For example, Korean Patent Publication Nos. 10-2009-0073532 and 10-2011-0017194 disclose complex optical sheets having different patterns formed on upper and lower surfaces thereof.

Techniques have been proposed wherein a prism pattern or a plurality of lenses are formed on the upper surface of a transparent film and diffusion beads, layers having different refractive indices, or a light diffusion layer including air bubbles is formed on the lower surface of the transparent film opposite a light source.

However, multifunctional optical sheets developed based on the conventional techniques fail to meet requirements in terms of image quality such as luminance and contrast, which can be achieved by conventional optical sheets. There is thus a need to develop new optical sheets that meet requirements in terms of image quality such as luminance and contrast on display screens and have combined functions sufficient to replace many optical sheets used in displays.

Another need exists for a light guide plate that performs the roles of one or more optical sheets or an optical sheet that can perform complex functions, like a light collecting sheet or plate in a solar power generation device. These needs can be met by the use of 3-dimensional complex multilayer structures.

According to an established method for manufacturing a structure having a complex 3-dimensional shape, individual layers are sequentially formed by a lithography or imprinting process. According to another established method, a first pattern is formed on a substrate and the surface is post-processed by a chemical or physical technique.

However, these methods require two or more processes to form a multilayer pattern consisting of two or more layers and greatly limit the structure or size of a second or third pattern to be formed. There is thus a need for a method for manufacturing a 3-dimensional complex multilayer structure in a simpler manner.

SUMMARY OF THE INVENTION

It is an object of the present invention to provide a 3-dimensional complex multilayer structure having a complex shape that can be utilized in various fields, including next generation 3-dimensional semiconductors, next generation displays, optical components, dry adhesion based on the use of fine ciliary structures, micro/nano piezoelectric devices, lighting devices, and biocell/virus research using micropatterns.

It is another object of the present invention to provide a method for manufacturing the 3-dimensional complex multilayer structure.

The present invention provides a 3-dimensional complex multilayer structure including a first pattern and a second pattern having different thicknesses formed on one or both surfaces of a plate wherein the first pattern is selected from the group consisting of parallel lines, parallel curves, parallel zigzag lines, and combinations thereof which do not meet each other, the second pattern is not parallel to the first pattern and is selected from the group consisting of parallel lines, parallel curves, parallel zigzag lines, and combinations thereof which do not meet each other, the interfaces between the first pattern and the second pattern form figures selected from the group consisting of polygons, circles, ellipses, and combinations thereof, and the figures are repetitively formed on one or both surfaces of the plate.

The parallel direction of the first pattern may be orthogonal to the parallel direction of the second pattern.

The 3-dimensional complex multilayer structure of the present invention may further include a third pattern through which the first and second patterns are spaced a predetermined height from each other.

The first and second patterns may be formed using a heat- or active energy ray-curable resin.

A cross section perpendicular to the parallel directions of the first and second patterns may be in the form of a wave. In the wavy cross section, a pair of adjacent troughs and a crest between the troughs may correspond to the three corners of a triangle, both end points of a chord and one point of an arc of a segment of a circle, both end points of a chord and one point of an arc of a segment of an ellipse, or the two corners and one round-edged corner of a triangle.

In the wavy cross section, a pair of adjacent troughs and a crest between the troughs may correspond to the three corners of a triangle or the two corners and one round-edged corner of a triangle whose included angle is from 30 to 150°.

The height from the trough to the crest in the wavy cross section may be from 1 to 500 μm.

The 3-dimensional complex multilayer structure may have a refractive index of 1.3 to 1.9.

The diameter, the longest diameter or the length of one of the sides of each of the repetitively formed figures may be from 1 to 5000 μm.

The present invention also provides an optical component, a semiconductor device, a piezoelectric device or a biosensor using the 3-dimensional complex multilayer structure.

The optical component may be an optical sheet, a light guide plate for an edge type liquid crystal display, a diffusion plate for a direct type liquid crystal display or a light collecting plate for a solar power generation device.

The present invention also provides a method for manufacturing a 3-dimensional complex multilayer structure, including (A) preparing a second base mold having a first pattern selected from the group consisting of parallel lines, parallel curves, parallel zigzag lines, and combinations thereof which do not meet each other, on one surface thereof, (B) preparing a mask mold including a first support in the form of a flexible or rigid plate through which active energy rays transmit, a mask repetitively formed or perforated with polygons, circles, ellipses or combinations thereof on one surface of the first support and through which active energy rays do not transmit, and a patterned layer adapted to cover the first support and the mask and having a second pattern formed on the surface opposite to the surface facing the first support or a second pattern formed in an exposed portion of one surface of the first support, (C) applying a resin for a second mold onto the first pattern of the second base mold or the mask mold, (D) pressing the second base mold against the mask mold, which is separated from the second base mold by the resin, such that the parallel direction of the second pattern is not parallel to that of the first pattern, (E) pressurizing the mask mold toward the resin and curing the resin by irradiating the mask mold with active energy rays or heating the mask mold to form a second mold, (F) separating the second mold and the mask mold from each other, and (G) removing an uncured portion of the resin by dissolution in a solvent.

The method of the present invention may further include (H) applying a resin for a third mold to the multilayer structure having undergone step (G) as a master, (I) bringing a second support into close contact with the resin, (J) pressurizing the second support toward the master and curing the resin by irradiating the second support with active energy rays or heating the second support to form a third mold, (K) separating the third mold from the master, (L) applying a resin for patterning to the third mold or a substrate, (M) pressing the third mold against the substrate, which is separated from the third mold by the resin for patterning, (N) curing the resin by irradiating the third support or the substrate with active energy rays or heating the third support or the substrate to form a pattern, and (O) separating the patterned 3-dimensional complex multilayer structure from the third mold.

The second pattern is not parallel to the first pattern and may be selected from the group consisting of parallel lines, parallel curves, parallel zigzag lines, and combinations thereof which do not meet each other.

In step (D), the second base mold may be pressed against the mask mold, which is separated from second base by the resin, to the extent that a third pattern is formed through which the first and second patterns are spaced a predetermined height from each other.

In step (D), the second base mold may be pressed against the mask mold, which is separated from the second base mold by the resin, such that the parallel direction of the second pattern is orthogonal to the parallel direction of the first pattern.

A cross section perpendicular to the parallel directions of the first and second patterns may be in the form of a wave. In the wavy cross section, a pair of adjacent troughs and a crest between the troughs may correspond to the three corners of a triangle, both end points of a chord and one point of an arc of a segment of a circle, both end points of a chord and one point of an arc of a segment of an ellipse, or the two corners and one round-edged corner of a triangle.

The 3-dimensional complex multilayer structure having the first and second patterns may be formed on either or both surfaces of the substrate.

The first pattern may be thicker than the second pattern or vice versa.

The mask mold includes a first support in the form of a flexible or rigid plate through which active energy rays transmit, a mask repetitively formed or perforated with polygons, circles, ellipses or combinations thereof on one surface of the first support and through which active energy rays do not transmit, and a patterned layer adapted to cover the first support and the mask and having a pattern formed on the surface opposite to the surface facing the first support.

Alternatively, the mask mold may include a first support in the form of a flexible or rigid plate through which active energy rays transmit, a mask repetitively formed or perforated with polygons, circles, ellipses or combinations thereof on one surface of the first support and through which active energy rays do not transmit, and a pattern formed in a portion, where the first support is exposed, of one surface of the first support on which the mask is formed.

An adhesion promoting layer may be further formed between the pattern layer and each of the first support and the mask.

The pattern layer, the pattern or the adhesion promoting layer may be cured by irradiation with active energy rays or heating.

Each of the first and second patterns may be patterns selected from the group consisting of parallel lines, parallel curves, parallel zigzag lines, and combinations thereof which do not meet each other.

The mask may be a printed colored coating or a deposited opaque metal.

The present invention also provides a method for producing a mask mold, including printing a portion of one surface of a first support in the form of a flexible or rigid plate through which active energy rays transmit, to form a colored coating through which active energy rays do not transmit, applying a resin for a first mold to a first base mold through which active energy rays transmit or the surface of the first support on which the colored coating is printed, pressing the first support against the first base mold, which is separated from the first support by the resin, pressurizing the first support toward the first base mold and curing the resin by irradiating the first base mold with active energy rays or heating the first base mold to form a mask mold, and separating the mask mold from the first base mold.

The present invention also provides a method for producing a mask mold, including printing a portion of one surface of a first support in the form of a flexible or rigid plate through which active energy rays transmit, to form a colored coating through which active energy rays do not transmit, applying a resin for an adhesion promoting layer to the surface of the first support on which the colored coating is printed, curing the resin by irradiating the resin with active energy rays or heating the resin to form an adhesion promoting layer, applying a resin for a first mold to a first base mold through which active energy rays transmit or the adhesion promoting layer, pressing the adhesion promoting layer against the first base mold, which is separated from the adhesion promoting layer by the resin, pressurizing the first support toward the first base mold and curing the resin by irradiating the first base mold with active energy rays or heating the first base mold to form a mask mold, and separating the mask mold from the first base mold.

The colored coating may be repetitively printed or perforated with polygons, circles, ellipses or combinations thereof.

The present invention also provide a method for producing a mask mold, including masking a portion of one surface of a first support in the form of a flexible or rigid plate through which active energy rays transmit, with a shadow mask and depositing the masked first support with an opaque metal through which active energy rays do not transmit, applying a resin for a first mold to a first base mold through which active energy rays transmit or the surface of the first support on which the opaque metal is deposited, pressing the first support against the first base mold, which is separated from the first support by the resin, pressurizing the first support toward the first base mold and curing the resin by irradiating the first base mold with active energy rays or heating the first base mold to form a mask mold, and separating the mask mold from the first base mold.

The present invention also provide a method for producing a mask mold, including masking a portion of one surface of a first support in the form of a flexible or rigid plate through which active energy rays transmit, with a shadow mask and depositing the masked first support with an opaque metal through which active energy rays do not transmit, applying a resin for an adhesion promoting layer to the surface of the first support on which the opaque metal is deposited, curing the resin by irradiating the resin with active energy rays or heating the resin to form an adhesion promoting layer, applying a resin for a first mold to a first base mold through which active energy rays transmit or the adhesion promoting layer, pressing the adhesion promoting layer against the first base mold, which is separated from the adhesion promoting layer by the resin, pressurizing the first support toward the first base mold and curing the resin by irradiating the first base mold with active energy rays or heating the first base mold to form a mask mold, and separating the mask mold from the first base mold.

The opaque metal may be repetitively deposited or perforated with polygons, circles, ellipses or combinations thereof.

The present invention also provides mask molds produced by the methods.

As described above, the 3-dimensional complex multilayer structure of the present invention includes different complex patterns. In contrast, a conventional device has a kind of simple pattern. In addition, the 3-dimensional complex multilayer structure of the present invention can be manufactured by a simple process. Therefore, the 3-dimensional complex multilayer structure of the present invention can find application in various fields, including, but not limited to, optical components for displays (e.g., light guide plates, diffusion plates, prisms, and color filters), next generation displays and display devices (e.g., TFTs, OTFTs, oxide TFTs, flexible displays, and transparent displays), next generation 3-dimensional semiconductors, dry adhesion based on the use of fine ciliary structures, micro/nano piezoelectric devices, lighting optical components, and biocell/virus research using micropatterns.

Particularly, the 3-dimensional complex multilayer structure of the present invention can be applied to an optical component without the need to use a plurality of optical sheets, achieving an improvement in economic efficiency and a reduction in thickness. In the case where the optical component may be a light guide plate, sufficient light collection effects are exhibited even without the need for an additional light collecting sheet. As a result, the light guide plate can be combined with a diffusion sheet to realize a front luminance above the level of a conventional optical component and can reduce optical loss caused when light from a light source passes through a number of optical sheets. The same advantages also apply for diffusion plates used in direct type liquid crystal displays and light collecting components used in solar power generation devices. Furthermore, since the number of optical sheets in the optical component is reduced, the production process of the optical component is simplified, and therefore, the stability and economic efficiency of the process are improved.

In the field of dry adhesion, numerous attempts have been made to simulate the multilayer fine ciliary structures of the toes of gecko lizards or the legs of beetles. The multilayer fine ciliary structures are characterized by effective elastic moduli due to their structural properties in comparison with the same materials. Based on these characteristics, the multilayer fine ciliary structures using the van der Waals force have high adhesive strength to various adherends. However, such techniques require one or more processes to form a single layer of a ciliary structure. The processes are very complicated to carry out and are sensitive to the ambient environment. Accordingly, the techniques have no significant influence on the production of ciliary structures on a large scale.

In contrast, the method of the present invention enables the production of a multilayer fine ciliary structure consisting of two or more layers by one-time processing. The method of the present invention greatly simplifies the production of a multilayer fine ciliary structure compared to the prior art. In addition, the method of the present invention can be repeated twice, enabling the formation of a pattern consisting of four or more layers. The method of the present invention can utilize an existing system based on an imprinting process, thus being suitable for mass production.

DETAILED DESCRIPTION OF THE INVENTION

Preferred embodiments will now be described in detail. Although explanatory description is provided with particular features such as specific elements, it is provided to assist in a more inclusive understanding of the invention and those skilled in the art will appreciate that the invention may be practiced otherwise than as specifically described herein. In the description of the present invention, detailed explanations of well-known functions or constructions are omitted when it is deemed that they may unnecessarily obscure the essence of the present invention.

First, some of the terms used herein are defined.

In the present specification, when structures having different pattern shapes are formed with different heights from a substrate, they are regarded as separate layers. Accordingly, a structure including all layers is referred to as a "multilayer".

Figure 14:
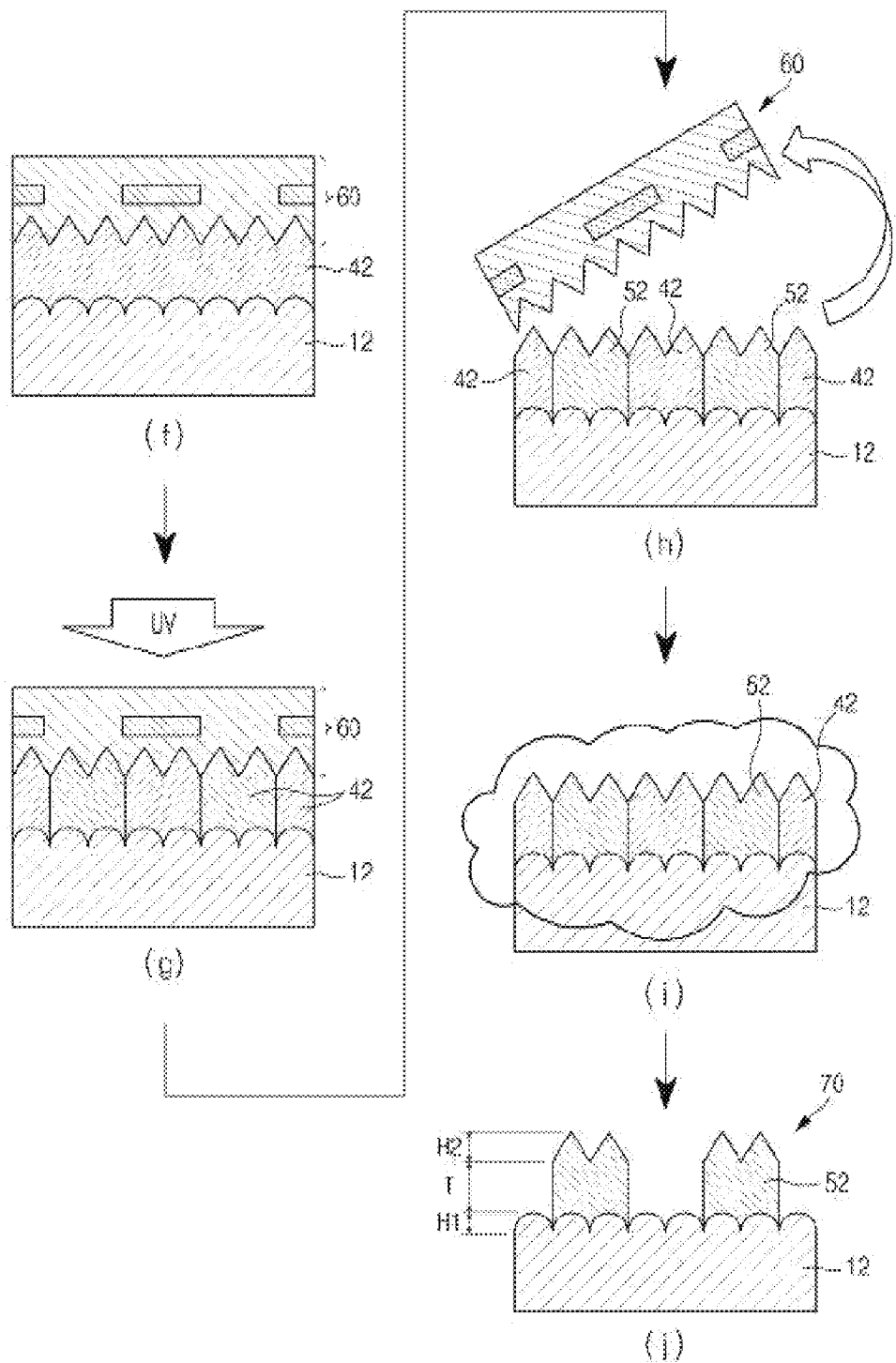
FIGS. 14 and 15 are conceptual views illustrating methods for manufacturing 3-dimensional complex multilayer structures, as masters, according to embodiments of the present invention.
Figure 15:
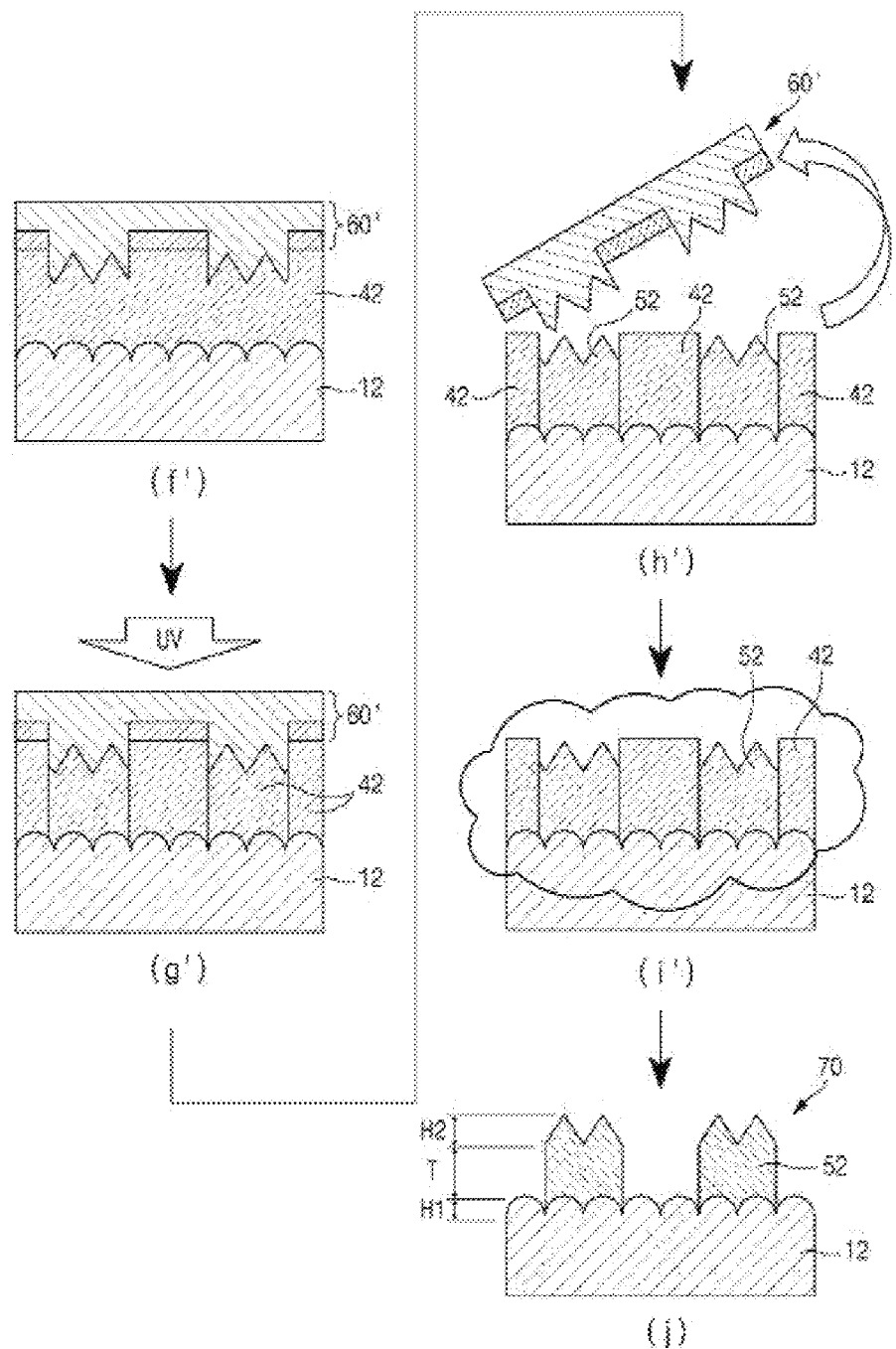
Figure 16:
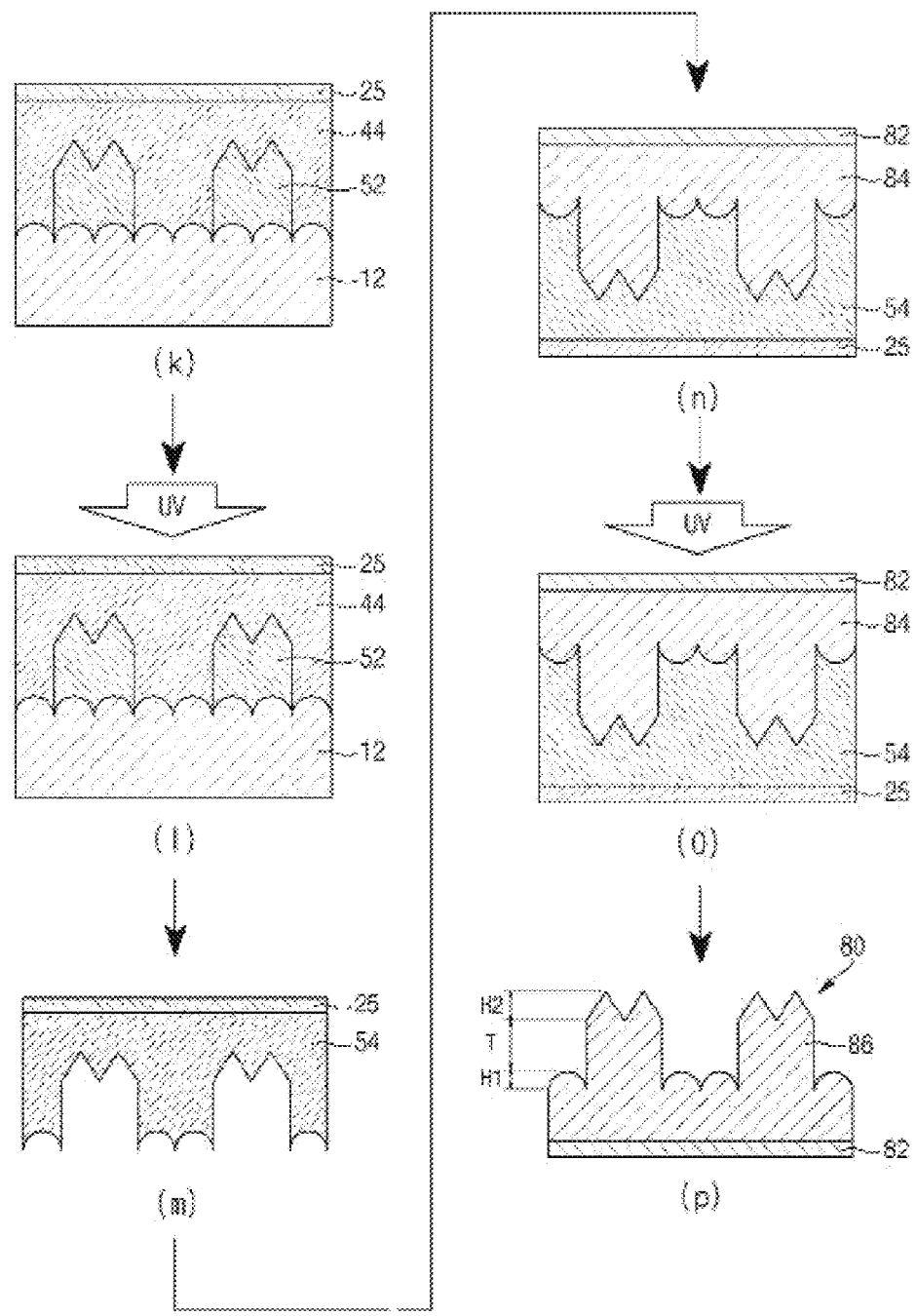
FIG. 16 is a conceptual view illustrating a method for manufacturing a 3-dimensional complex multilayer structure from a master according to one embodiment of the present invention.

For example, referring to the cross sections of 3-dimensional complex multilayer structures illustrated in FIGS. 14 to 16, when a pattern having a height H1 on a first base mold is defined as a first pattern and a pattern with a height H2 non-parallel to the first pattern and spaced a height T from the first pattern is defined as a second pattern, the height T can be expressed as the thickness of the second pattern or the height of a third pattern because when the heights of the second and third patterns are large, the respective structures have fictions of their own.

According to a first type, the height T of the third pattern may be equal to or smaller than the height H1 of the first pattern (T≤H1) and the height H2 of the second pattern (T≤H2). In the case where the height (T) of the third pattern approaches zero, the second pattern can be considered to be formed directly on the first pattern, like patterns illustrated in FIG. 18.

Figure 28:
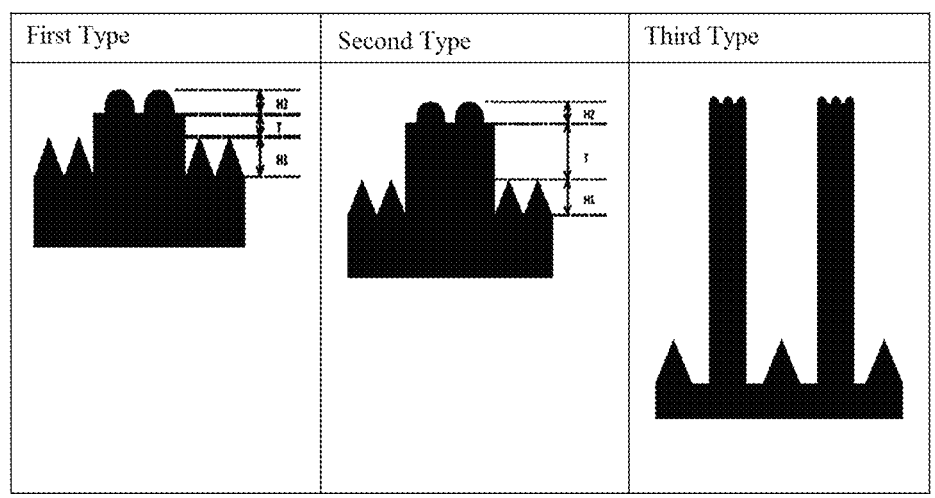
FIG. 28 is a diagram showing embodiments with a First Type, Second Type, and Third Type of structure.

According to a second type shown in FIG. 28, the third pattern is higher than the first and second patterns (T>H1, T>H2). The total height of the patterns is an important factor in the determination of an effective elastic modulus. In the case of a third type in which T is much higher (H2<H1<<T), the total height (H1+T+H2) is determined by T, and therefore, the third pattern performs its structural (or optical) functions.

Herein, a complex optical component using a 3-dimensional complex multilayer structure of the present invention is defined as an optical member that focuses rays of light from two directions onto a direction perpendicular thereto and is intended to include optical sheets, light guide plates for edge type LCDs, diffusion plates for direct type LCDs, and light collecting sheets and light collecting plates for solar power generation devices.

The term "active energy rays" refers to both particle beams and electromagnetic waves whose energy is sufficient to cure a given resin and is intended to include UV light, lasers, microwaves, electron beams, and X-ray.

EMBODIMENTS

Hereinafter, a description will be given concerning embodiments of the present invention.

The present invention provides a 3-dimensional complex multilayer structure including a first pattern, a second pattern, and optionally a third pattern wherein the first and second patterns are formed on one surface of a plate and have different thicknesses, the first pattern is selected from the group consisting of parallel lines, parallel curves, parallel zigzag lines, and combinations thereof which do not meet each other, the second pattern is not parallel to the first pattern and is selected from the group consisting of parallel lines, parallel curves, parallel zigzag lines, and combinations thereof which do not meet each other, the interfaces between the first pattern and the second pattern form figures selected from the group consisting of polygons, circles, ellipses, and combinations thereof, and the figures are repetitively formed on one surface of the plate.

The two or more patterns are formed in the same plane of the 3-dimensional complex multilayer structure. This arrangement enables the 3-dimensional complex multilayer structure to perform the functions of two or more optical components. For example, the 3-dimensional complex multilayer structure of the present invention may include prism patterns as the first and second patterns. In this case, an optical sheet using the 3-dimensional complex multilayer structure can effectively collect rays of light from two directions. Alternatively, the first pattern may be a prism pattern and the second pattern may be a diffusion pattern. In this case, the 3-dimensional complex multilayer structure can perform the functions of both a light collecting sheet and a diffusion sheet.

Particularly, when the parallel direction (Direction 1 in FIG. 1) of the first pattern selected from the group consisting of parallel lines, parallel curves, parallel zigzag lines, and combinations thereof which do not meet each other is orthogonal to the parallel direction (Direction 2 in FIG. 1) of the second pattern non-parallel to the first pattern and selected from the group consisting of parallel lines, parallel curves, parallel zigzag lines, and combinations thereof which do not meet each other, the 3-dimensional complex multilayer structure can effectively collect light in a direction orthogonal to each other. Accordingly, the use of the 3-dimensional complex multilayer structure in an optical component ensures a maximum luminance of the optical component.

Figure 1:
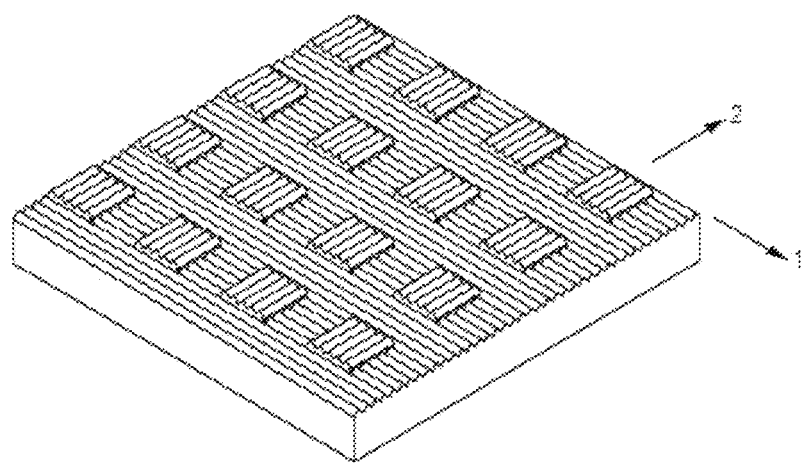
FIG. 1 is a perspective view illustrating one embodiment of the present invention in which a first pattern is a prism pattern and a second pattern is a prism pattern orthogonal to the parallel direction of the first pattern.
Figure 2:
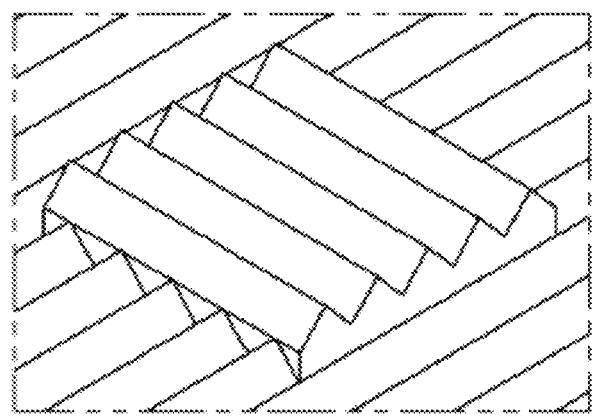
FIG. 2 is a partially enlarged view of FIG. 1.

FIGS. 1 and 2 illustrate one embodiment of the present invention in which the first and second patterns are prism patterns orthogonal to each other. The second pattern is thicker than the first pattern, indicating the formation of a third pattern (not illustrated) between the first and second patterns, and the interfaces between the first and second patterns form tetragons. When the patterned 3-dimensional complex multilayer structure is used as a light guide plate or a diffusion plate, a sufficient front luminance can be achieved without the need for an additional light collecting sheet. When this pattern is formed on an optical sheet, the ability of the patterned optical sheet to collect light is comparable to that of two conventional optical sheets.

Each of the sides of the tetragons formed at the interfaces between the first and second patterns is preferably from 1 to 5000 μm in length. If the length is smaller than the lower limit defined above, the patterning is difficult and the production of a mold is a very laborious work. Meanwhile, if the length is larger than the upper limit defined above, the 3-dimensional complex multilayer structure is visually discernible in an optical component, and as a result, a uniform luminance of the optical component cannot be ensured, thus being unsuitable for use in a display. However, the upper limit of the length is not particularly restricted in applications other than displays.

The 3-dimensional complex multilayer structure of the present invention may also have parallel curves and parallel zigzag lines as well as parallel lines that are orthogonal to each other. The interfaces between the first and second patterns may form polygons other than tetragons, circles, ellipses, or combinations thereof.

Figure 3:
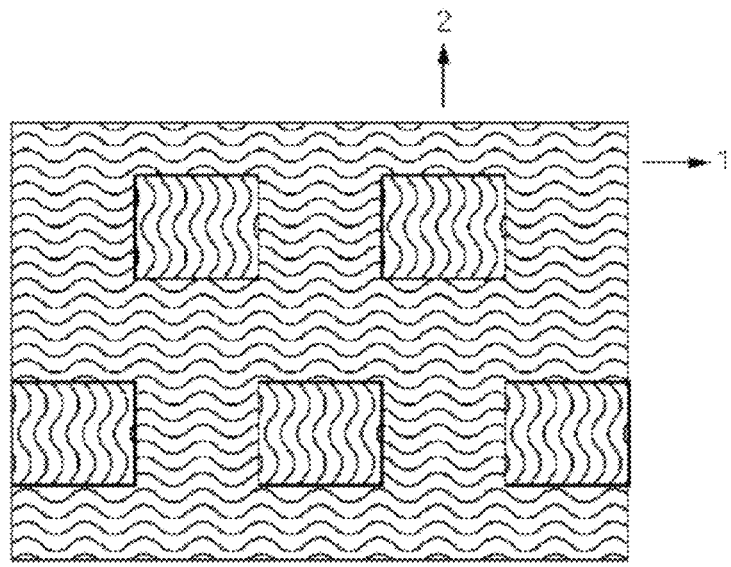
FIG. 3 is a plan view illustrating one embodiment of the present invention in which a first pattern of parallel curves is combined with a second pattern of parallel curves orthogonal to the parallel direction of the first pattern.

For example, FIG. 3 illustrates a combination of a first pattern of parallel curves and a second pattern of parallel curves orthogonal to the parallel direction of the first pattern, and the interfaces between the first and second patterns form tetragons.

Figure 4:
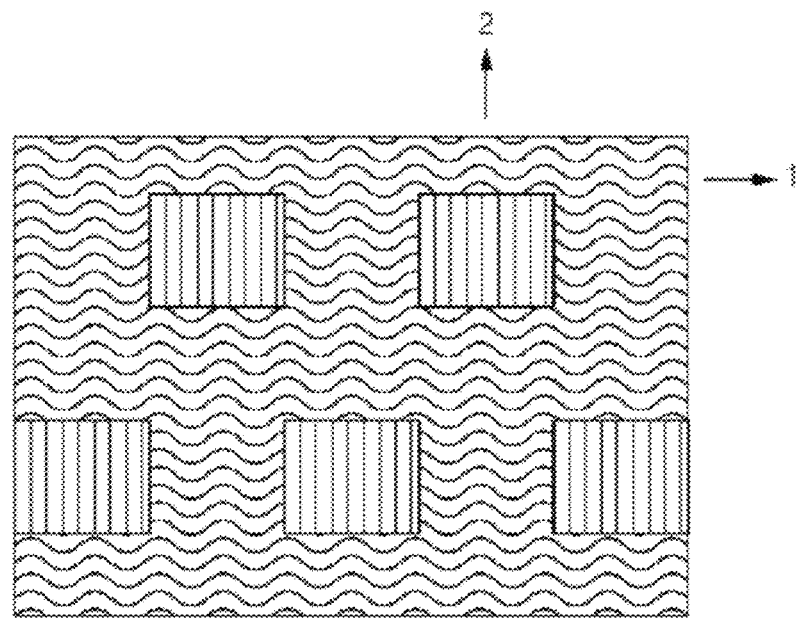
FIG. 4 is a plan view illustrating one embodiment of the present invention in which a first pattern of parallel curves is combined with a second pattern of parallel lines orthogonal to the parallel direction of the first pattern.

FIG. 4 illustrates a combination of a first pattern of parallel curves and a second pattern of parallel lines orthogonal to the parallel direction of the first pattern, and the interfaces between the patterns form tetragons.

Figure 5:
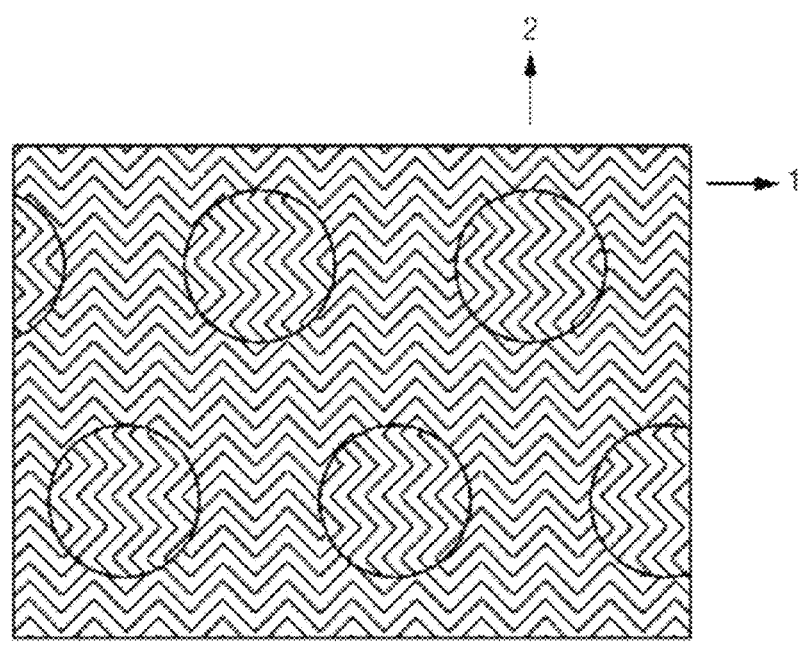
FIG. 5 is a plan view illustrating one embodiment of the present invention in which a first pattern of parallel zigzag lines is combined with a second pattern of parallel zigzag lines orthogonal to the parallel direction of the first pattern.

FIG. 5 illustrates a combination of a first pattern of parallel zigzag lines and a second pattern of parallel zigzag lines orthogonal to the parallel direction of the first pattern, and the interfaces between the patterns form circles.

Figure 6:
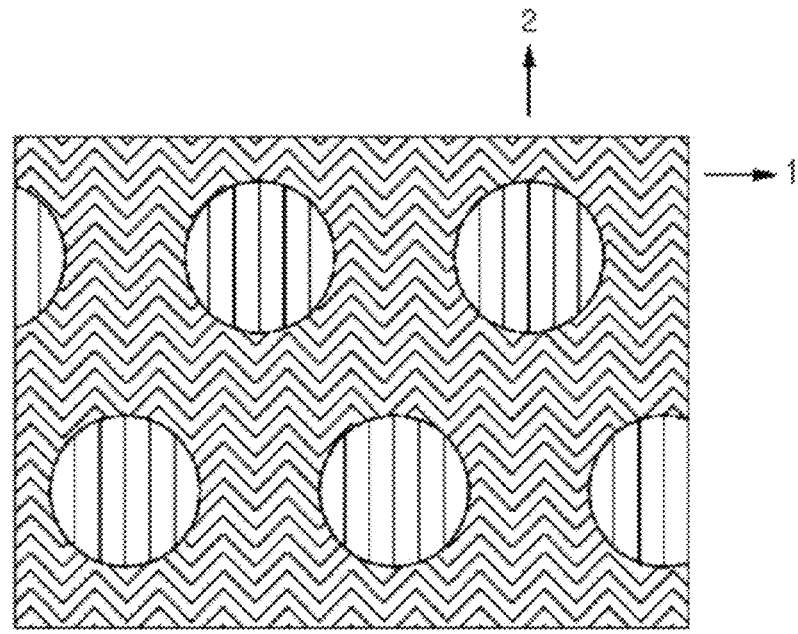
FIG. 6 is a plan view illustrating one embodiment of the present invention in which a first pattern of parallel zigzag lines is combined with a second pattern of parallel lines orthogonal to the parallel direction of the first pattern.

FIG. 6 illustrates a combination of a first pattern of parallel zigzag lines and a second pattern of parallel lines orthogonal to the parallel direction of the first pattern, and the interfaces between the patterns form circles.

Figure 7:
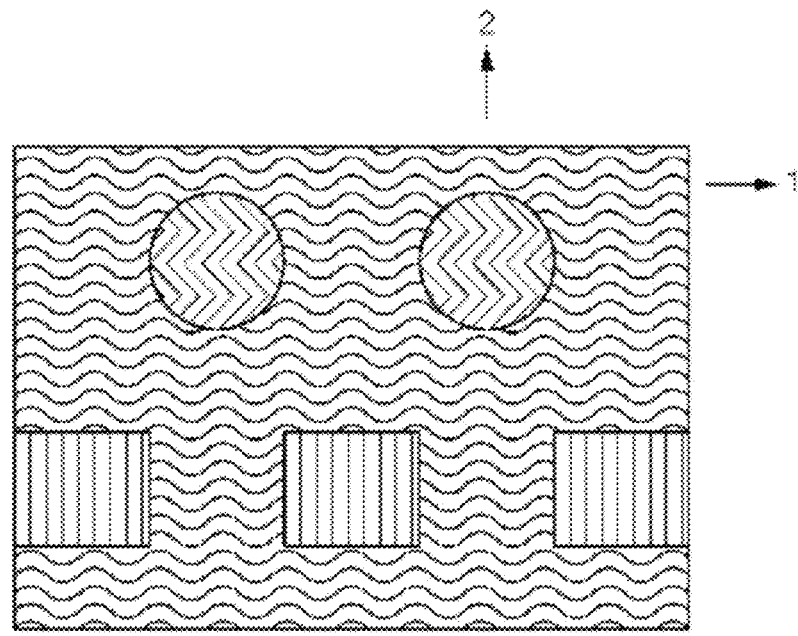
FIG. 7 is a plan view illustrating one embodiment of the present invention in which a first pattern of parallel curves is combined with a second pattern of parallel zigzag lines and parallel lines orthogonal to the parallel direction of the first pattern.

FIG. 7 illustrates a combination of a first pattern of parallel lines and a second pattern of parallel zigzag lines orthogonal to the parallel direction of the first pattern, and the interfaces between the patterns form circles and tetragons.

The first and second patterns are microstructures made of a heat- or active energy ray-curable resin.

The active energy ray-curable resin refers to a resin that can be cured by irradiation with active energy rays. Most conventional resins are cured by heating. However, during heat curing, thermal expansion occurs due to a difference between a maximum temperature upon heating and room temperature upon cooling, leading to volume shrinkage. Heat curing itself also causes volume shrinkage. As a result of the volume shrinkage, cracks are likely to occur and precise dimensions are difficult to attain. Further, thermal residual stress arising during heat curing shortens the life of components, requires much thermal energy for curing, limits the size of molded products, and requires a long time for curing.

In contrast, curing by active energy rays does not cause the problems of heat curing (e.g., crack, low precision, and thermal residual stress), is less energy and time consuming, and does not limit the size of molded products.

A cross section perpendicular to the parallel directions of the first and second patterns may be in the form of a wave. In the wavy cross section, a pair of adjacent troughs and a crest between the troughs may correspond to the three corners of a triangle, both end points of a chord and one point of an arc of a segment of a circle, both end points of a chord and one point of an arc of a segment of an ellipse, or the two corners and one round-edged corner of a triangle.

Figure 8:
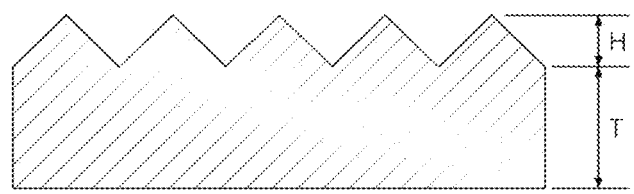
FIG. 8 is a cross-sectional view illustrating one embodiment of the present invention in which a pair of adjacent troughs and a crest between the troughs correspond to the three corners of a triangle in a wavy cross section of patterns.
Figure 9:
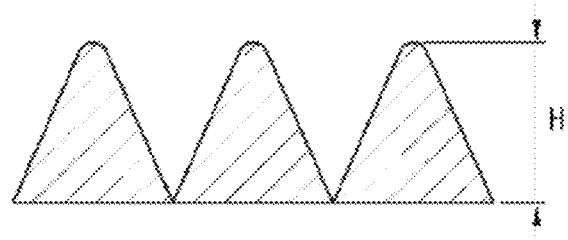
FIG. 9 is a cross-sectional view illustrating one embodiment of the present invention in which the crests are round-edged in FIG. 8.

FIG. 8 illustrates one embodiment of the first or second pattern of the 3-dimensional complex multilayer structure according to the present invention in which a pair of adjacent troughs and a crest between the troughs correspond to the three corners of a triangle in a wavy cross section. When the second pattern is used, the third pattern may be formed to a thickness T.

When the patterned structure of the present invention is used as a prism sheet, rays of light from two different directions can be collected simultaneously. At this time, the included angle (denoted by "A" in FIG. 8) between the crests is preferably from 30 to 150°. If the included angle is smaller than 30°, light is totally reflected and cannot pass through the structure, molding is difficult to perform, and the sharp tips of the structure are easily broken into pieces, resulting in poor handling performance. Meanwhile, if the included angle exceeds 150°, the structure is close to a plane rather than a prism and is thus ineffective in light collection. As a result, light is scattered, leading to a reduction in luminance.

Figure 10:
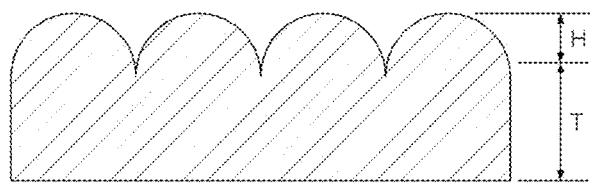
FIG. 10 is a cross-sectional view illustrating one embodiment of the present invention in which a pair of adjacent troughs and a crest between the troughs correspond to both end points of a chord and one point of an arc of a segment of a circle, respectively, in a wavy cross section of patterns.

FIG. 10 illustrates one embodiment of the first or second pattern of the 3-dimensional complex multilayer structure according to the present invention in which a pair of adjacent troughs and a crest between the troughs correspond to both end points of a chord and one point of an arc of a segment of a circle, respectively, in a wavy cross section. When the patterned 3-dimensional complex multilayer structure is used as a diffusion sheet, it spreads light, ensuring a wide viewing angle and a uniform luminance.

Figure 11:
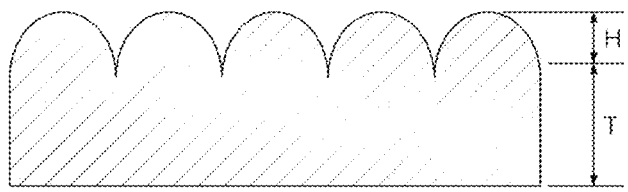
FIG. 11 is a cross-sectional view illustrating one embodiment of the present invention in which a pair of adjacent troughs and a crest between the troughs correspond to both end points of a chord and one point of an arc of a segment of an ellipse, respectively, in a wavy cross section of patterns.

FIG. 11 illustrates one embodiment of the first or second pattern of the 3-dimensional complex multilayer structure according to the present invention in which a pair of adjacent troughs and a crest between the troughs correspond to both end points of a chord and one point of an arc of a segment of an ellipse, respectively, in a wavy cross section. When the 3-dimensional complex multilayer structure is in the form of a diffusion sheet, it spreads light, ensuring a wide viewing angle and a uniform luminance, as in the segment of the circle.

When the 3-dimensional complex multilayer structure of the present invention is used as an optical component, the height H from the trough to the crest in the wavy cross section is preferably from 1 to 500 µm. If the height is smaller than the lower limit defined above, the effects of the pattern resulting from the step height disappear. Meanwhile, if the height exceeds the upper limit defined above, the 3-dimensional complex multilayer structure is visually discernible, causing poor visibility, and is excessively large in thickness.

When it is intended to use the 3-dimensional complex multilayer structure including the first and second patterns as an optical sheet, its refractive index is preferably adjusted to 1.3 to 1.9.

The 3-dimensional complex multilayer structure may be used without limitation in any optical component that can guide and control the path of light. Examples of suitable optical components include various kinds of optical sheets capable of light collection or dispersion, light guide plates for edge type liquid crystal displays, diffusion plates for direct type liquid crystal displays, and light collecting sheets and light collecting plates for solar power generation devices.

In addition to the above optical components, the 3-dimensional complex multilayer structure of the present invention can be used in optical components for displays, such as color filters, next generation displays and display devices, such as TFTs, OTFTs, oxide TFTs, flexible displays, and transparent displays, next generation 3-dimensional semiconductors, dry adhesion based on the use of fine ciliary structures, micro/nano piezoelectric devices, lighting optical components, and biocell/virus research using micropatterns, but are not limited to these applications.

The 3-dimensional complex multilayer structure of the present invention may be manufactured using a mask mold, as illustrated in FIGS. 14 and 15.

First, a second base mold 12 is prepared. The second base mold 12 is formed with a first pattern selected from the group consisting of parallel lines, parallel curves, parallel zigzag lines, and combinations thereof which do not meet each other, on one surface thereof [step (f) of FIG. 14 and step (f) of FIG. 15].

Separately, a mask mold 60 or 60' is prepared. The mask mold 60 or 60' includes a first support 20 in the form of a flexible or rigid plate through which active energy rays transmit, a mask 30 repetitively formed or perforated with polygons, circles, ellipses or combinations thereof on one surface of the first support 20 and through which active energy rays do not transmit, and a patterned layer adapted to cover the first support 20 and the mask 30 and having a second pattern formed on the surface opposite to the surface facing the first support 20 or a second pattern formed in an exposed portion of one surface of the first support 20 [step (f) of FIG. 14 and step (f') of FIG. 15].

The second pattern is not parallel to the first pattern and may be selected from the group consisting of parallel lines, parallel curves, parallel zigzag lines, and combinations thereof which do not meet each other.

Then, a resin 42 for a second mold is applied onto the first pattern of the second base mold 12 or the mask mold 60 or 60', and the second base mold 12 is pressed against the mask mold 60 or 60', which is separated from the second base mold 12 by the resin 42, such that the parallel direction of the second pattern is not parallel to that of the first pattern [step (f) of FIG. 14 and step (f') of FIG. 15]. More preferably, the second base mold 12 is pressed against the mask mold 60 or 60', which is separated from the second base mold 12 by the resin 42, such that the parallel direction of the second pattern is orthogonal to the parallel direction of the first pattern.

Subsequently, the mask mold 60 or 60' is pressurized toward the resin 42, and the resin 42 is cured by irradiating the mask mold 60 or 60' with active energy rays or heating the mask mold to form a second mold 52 [step (g) of FIG. 14 and step (g') of FIG. 15].

Then, the second mold 52 and the mask mold 60 or 60' are separated from each other [step (h) of FIG. 14 and step (h') of FIG. 15], and an uncured portion of the resin 42 is removed by dissolution in a solvent [step (i) of FIG. 14 and step (i') of FIG. 15], completing the manufacture of the 3-dimensional complex multilayer structure according to the present invention [step (j) of FIG. 14 and step (j) of FIG. 15].

The 3-dimensional complex multilayer structure 70 thus manufactured may be used as a master to produce a mold, which may be used to manufacture another 3-dimensional complex multilayer structure (see FIG. 16).

Referring specifically to FIG. 16, the multilayer structure 70 manufactured by the method illustrated in FIG. 14 or 15 is used as a master. First, a resin for a third mold 44 is applied to the master, and a second support 25 is brought into close contact with the resin 44 [step (k) of FIG. 16]. The second support 25 is pressurized toward the master 70, and the resin 44 is cured by irradiating the second support 25 with active energy rays or heating the second support 25 to form a third mold 54 [step (I) of FIG. 16]. Then, the third mold 54 is separated from the master 70 [step (m) of FIG. 16].

Subsequently, a resin 84 for patterning is applied to the third mold 54 or a substrate 82, and the third mold 54 is pressed against the substrate 82, which is separated from the third mold 54 by the resin 84 [step (n) of FIG. 16]. The resin 84 is cured by irradiating the third mold 54 or the substrate 82 with active energy rays or heating the third mold 54 or the substrate 82 to form a pattern 86 [step (o) of FIG. 16]. The 3-dimensional complex multilayer structure 80 formed with the pattern 86 is separated from the third mold 54 [step (p) of FIG. 16].

The first and second patterns may also be formed on either or both surfaces of the multilayer structure. This is distinguished from the prior art in which separate patterns are formed on both surfaces of a single multilayer structure. When a multilayer structure whose both surfaces are patterned is used as an optical sheet, rays of light from two different directions cannot be effectively collected, and as a result, the intended effects of the present invention such as a reduction in the number of optical sheets or a remarkable rise in front luminance, cannot be sufficiently attained. However, the effects of the prior art multilayer structure are not limited in applications other than optical sheets.

Figure 29:
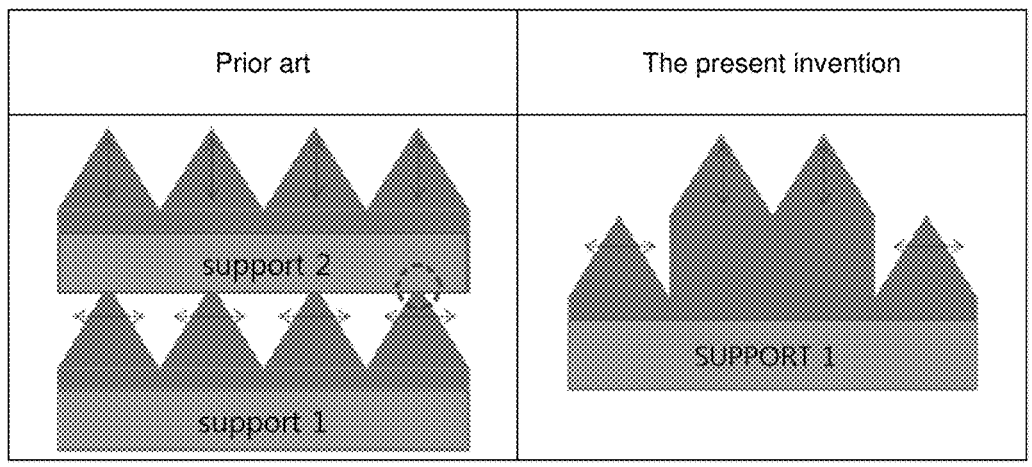
FIG. 29 is a diagram contrasting two structures.

In recent years, many complex (prism) optical sheets have been developed in which two prism sheets for different directions are attached using an adhesive or pressure-sensitive adhesive so as to overlap each other. The optical sheets enable simultaneous collection of rays of light from two directions but use two sheets of supports (PET), entailing high production costs. Another problem of the optical sheets is that the distal prism patterns are crushed after attachment, losing their optical functions. In contrast, the multilayer structure of the present invention is advantageous in terms of production cost and structural stability because prisms for two directions can be formed on one surface of a single support sheet (see FIG. 29).

The mask mold 60 used in the manufacture of the 3-dimensional complex multilayer structure according to the present invention includes a first support 20 in the form of a flexible or rigid plate through which active energy rays transmit, a mask 30 repetitively formed or perforated with polygons, circles, ellipses or combinations thereof on one surface of the first support 20 and through which active energy rays do not transmit, and a patterned layer adapted to cover the first support 20 and the mask 30 and having a pattern formed on the surface opposite to the surface facing the first support.

The mask mold 60' includes a first support 20 in the form of a flexible or rigid plate through which active energy rays transmit, a mask 30 repetitively formed or perforated with polygons, circles, ellipses or combinations thereof on one surface of the first support 20 and through which active energy rays do not transmit, and a pattern formed in a portion, where the first support 20 is exposed, of one surface of the first support 20 on which the mask 30 is formed.

Preferably, an adhesion promoting layer is further formed between the pattern layer and each of the first support 20 and the mask 30 to prevent the pattern layer or the pattern from falling off.

The pattern layer, the pattern or the adhesion promoting layer may be cured by active energy rays or heating. As described previously, during heat curing, thermal expansion occurs due to a difference between a maximum temperature upon heating and room temperature upon cooling, leading to volume shrinkage. Heat curing itself also causes volume shrinkage. As a result of the volume shrinkage, cracks are likely to occur and precise dimensions are difficult to attain. Further, thermal residual stress arising during heat curing shortens the life of components, requires much thermal energy for curing, limits the size of molded products, and requires a long time for curing. In contrast, curing by active energy rays is less energy and time consuming and does not limit the size of molded products. Due to these advantages, curing by active energy rays is widely used.

As in the 3-dimensional complex multilayer structure, the first and second patterns of the mask mold may be patterns selected from the group consisting of the group consisting of parallel lines, parallel curves, parallel zigzag lines, and combinations thereof which do not meet each other.

Particularly, the mask 30 may be a printed colored coating or a deposited opaque metal.

Figure 12:
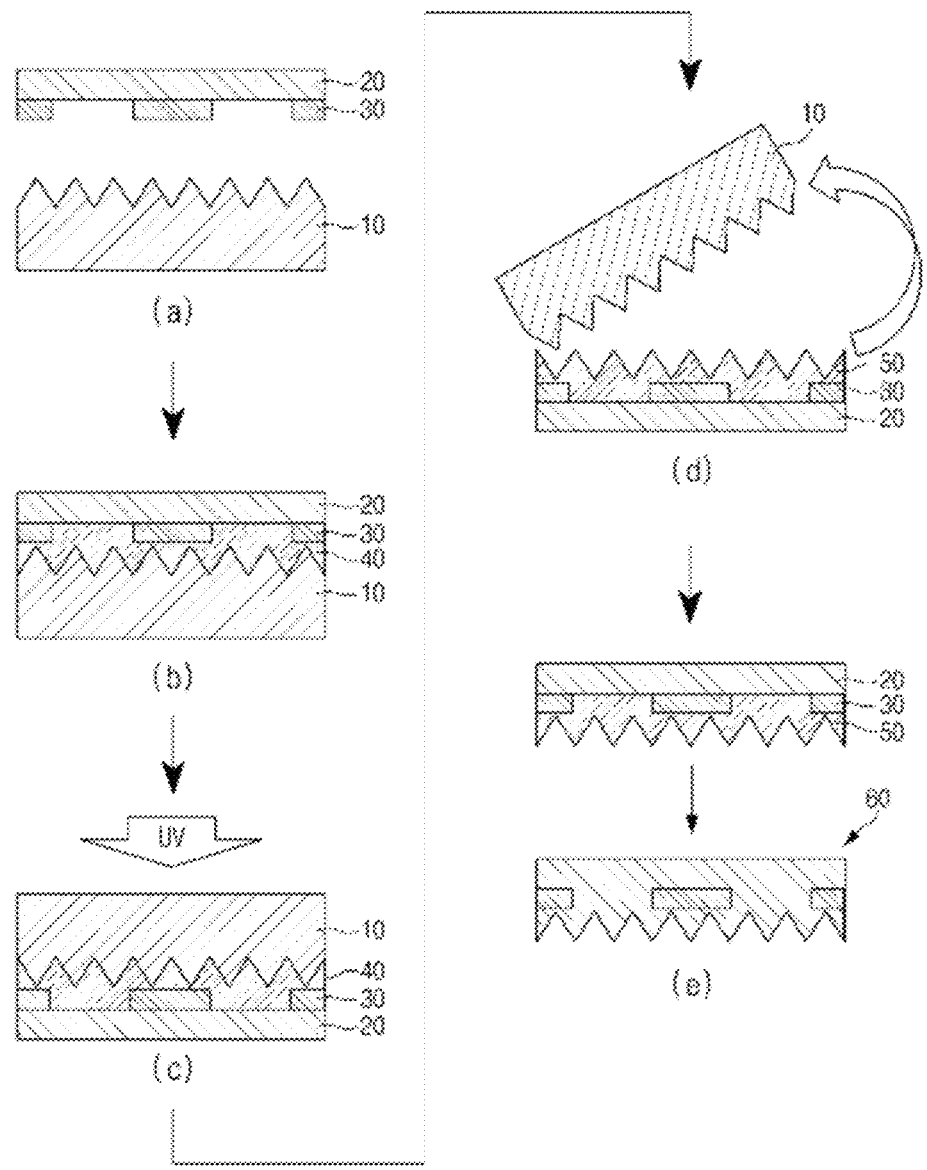
FIGS. 12 and 13 are conceptual views illustrating procedures for producing mask molds used in the manufacture of a 3-dimensional complex multilayer structure according to the present invention.
Figure 13:
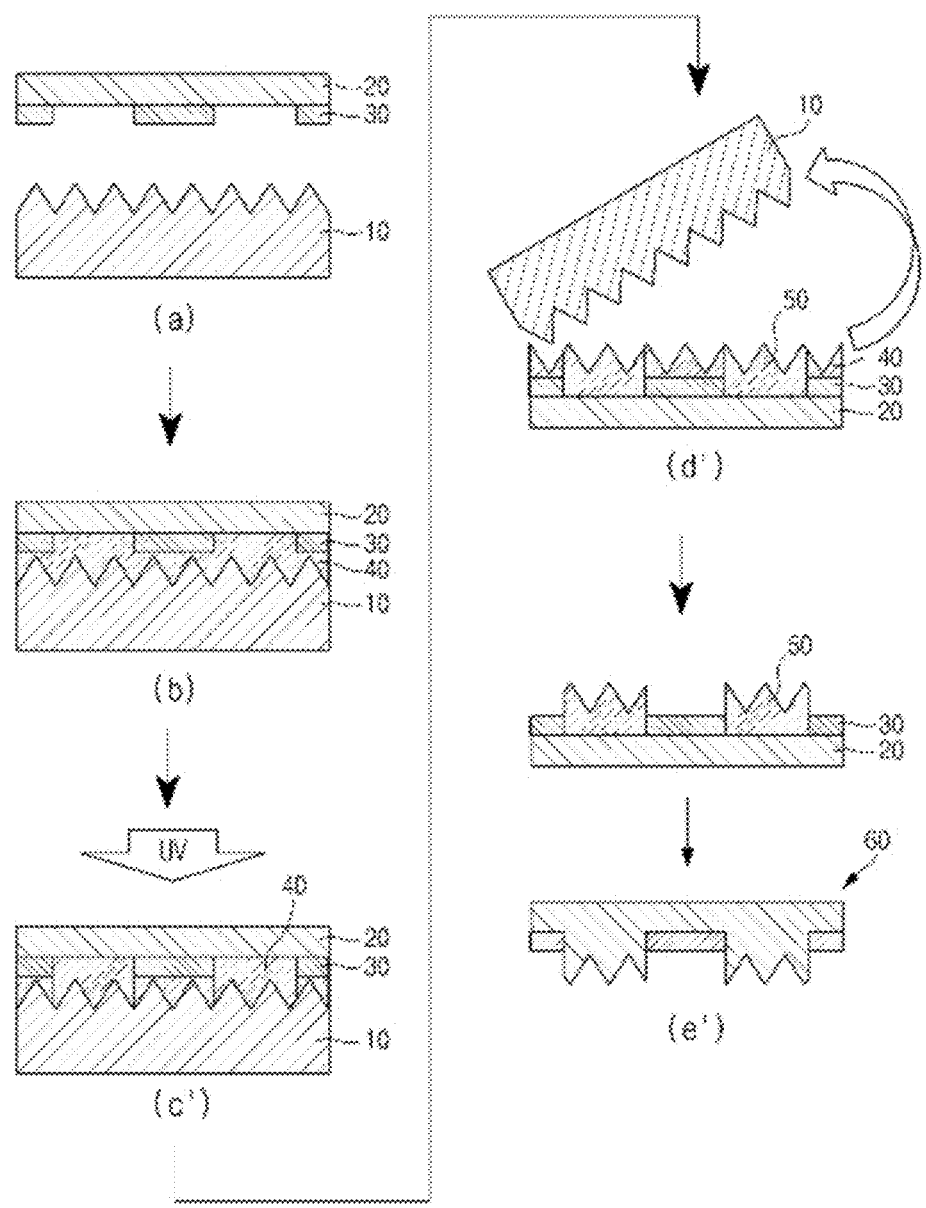

There is no restriction on the method for producing the mask molds 60 and 60'. For example, the mask molds 60 and 60' may be produced by an imprinting process, as illustrated in FIGS. 12 and 13. Inkjet or screen printing may be used to produce the mask molds 60 and 60'.

With reference to FIGS. 12 and 13, a detailed description will be given of the methods for producing the mask molds 60 and 60' by an imprinting process. First, a portion of one surface of a first support 20 in the form of a flexible or rigid plate through which active energy rays transmit is printed to form a colored coating through which active energy rays do not transmit [step (a) of FIG. 12 and step (a) of FIG. 13]. The colored coating may be repetitively printed or perforated with polygons, circles, ellipses or combinations thereof.

If needed, a resin for an adhesion promoting layer may be applied to the surface of the first support 20 on which the colored coating is printed and may be cured to form an adhesion promoting layer. The adhesion promoting layer serves to further strengthen the binding of the first support 20 to a first mold 50, which will be described below.

A resin 40 for a first mold is applied to a first base mold 10 through which active energy rays transmit or the surface of the first support 20 on which the colored coating is printed, and the first support 20 is pressed against the first base mold 10, which is separated from the first support by the resin 40 [step (b) of FIG. 12 and step (b) of FIG. 13].

Subsequently, the first support 20 is pressurized toward the first base mold 10 and the resin is cured by irradiating the first base mold 10 with active energy rays or heating the first base mold 10 to form the mask mold 60 or 60' [step (c) of FIG. 12 and step (c') of FIG. 13]. Step (c) of FIG. 12 illustrates irradiation with active energy rays onto the first base mold and irradiation with active energy rays onto the first support.

If needed, the method may further include removing an uncured portion of the resin 40 by dissolution in a solvent.

Finally, the mask mold 60 or 60' is separated from the first base mold 10 [step (d) of FIG. 12 and step (d') of FIG. 13]. The mask mold 60 or 60' is used in the manufacture of the 3-dimensional complex multilayer structure 80 according to the present invention [step (e) of FIG. 12 and step (e') of FIG. 13].

Alternatively, the mask mold 60 or 60' may be produced by the following procedure. First, a portion of one surface of a first support 20 in the form of a flexible or rigid plate through which active energy rays transmit, is masked with a shadow mask and the masked first support is deposited with an opaque metal through which active energy rays do not transmit [step (a) of FIG. 12 and step (a) of FIG. 13]. The opaque metal may be repetitively deposited or perforated with polygons, circles, ellipses or combinations thereof.

If needed, a resin for an adhesion promoting layer may be applied to the surface of the first support 20 on which the opaque metal is deposited and may be cured to form an adhesion promoting layer. The adhesion promoting layer serves to further strengthen the binding of the first support 20 to a first mold 50, which will be described below.

A resin 40 for a first mold is applied to a first base mold 10 through which active energy rays transmit or the surface of the first support 20 on which the opaque metal is deposited, and the first support 20 is pressed against the first base mold 10, which is separated from the first support by the resin 40 [step (b) of FIG. 12 and step (b) of FIG. 13].

Subsequently, the first support 20 is pressurized toward the first base mold 10 and the resin 40 is cured by irradiating the first base mold 10 with active energy rays or heating the first base mold 10 to form the mask mold 60 or 60' [step (c) of FIG. 12 and step (c') of FIG. 13].

If needed, the method may further include removing an uncured portion of the resin 40 by dissolution in a solvent.

Finally, the mask mold 60 or 60' is separated from the first base mold 10 [step (d) of FIG. 12 and step (d') of FIG. 13]. The mask mold 60 or 60' is used in the manufacture of the 3-dimensional complex multilayer structure 80 according to the present invention [step (e) of FIG. 12 and step (e') of FIG. 13].

The 3-dimensional complex multilayer structure of the present invention will be explained in terms of its effects when applied to an optical component.

Figure 17:
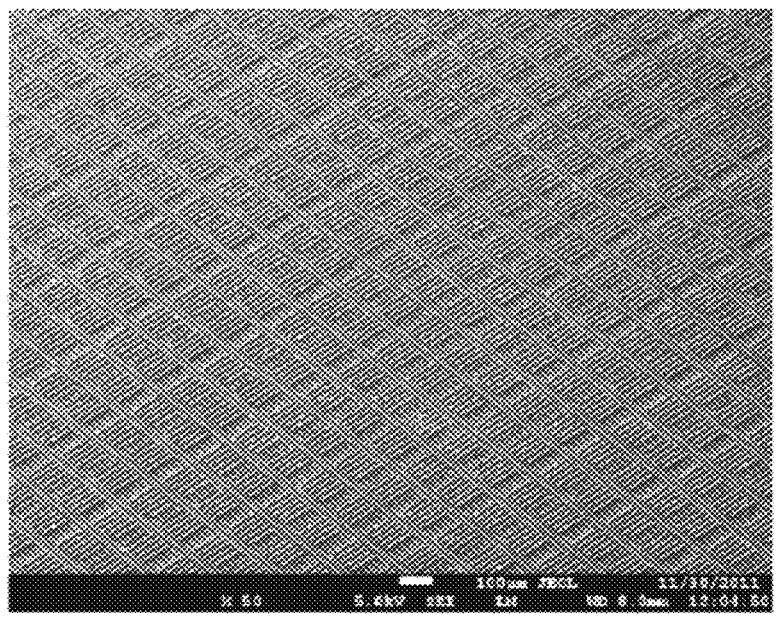
FIG. 17 is an image showing one embodiment of the present invention in which a first pattern is a prism pattern and a second pattern is a prism pattern orthogonal to the parallel direction of the first pattern.
Figure 18:
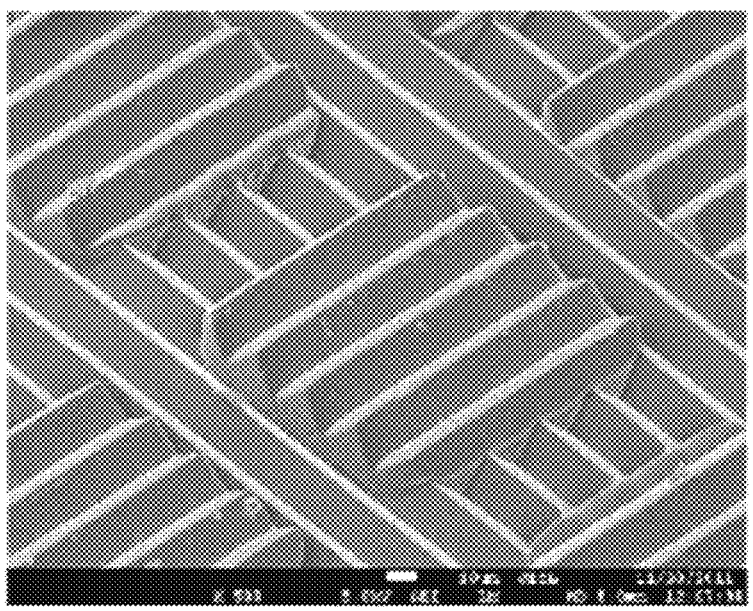
FIG. 18 is a partially enlarged view of FIG. 17.

FIG. 17 is an image showing one embodiment of the present invention in which the first pattern is a prism pattern and the second pattern is a prism pattern orthogonal to the parallel direction of the first pattern, FIG. 18 is a partially enlarged view of FIG. 17.

Figure 22:
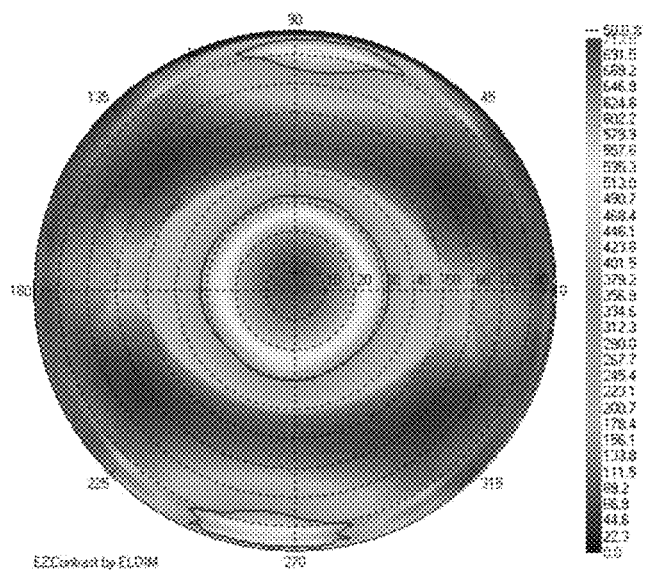

FIGS. 19 to 22 are diagrams showing the results of analysis of viewing angles for a conventional light guide plate (FIG. 19), a combination of a diffusion plate with the light guide plate (FIG. 20), a combination of a diffusion plate with the light guide plate (FIG. 20), a combination of a diffusion plate and a first light collecting sheet with the light guide plate (FIG. 21), and a combination of a diffusion plate, a first light collecting sheet, and a second light collecting sheet with the light guide plate (FIG. 22). High luminance portions of the structures are colored red. A red color was observed in the central portion of the structure of FIG. 22 in which the diffusion plate, the first light collecting sheet, and the second light collecting sheet were combined with the conventional light guide plate. This observation demonstrates the necessity of two light collecting sheets in the conventional light guide plate.

Figure 19:
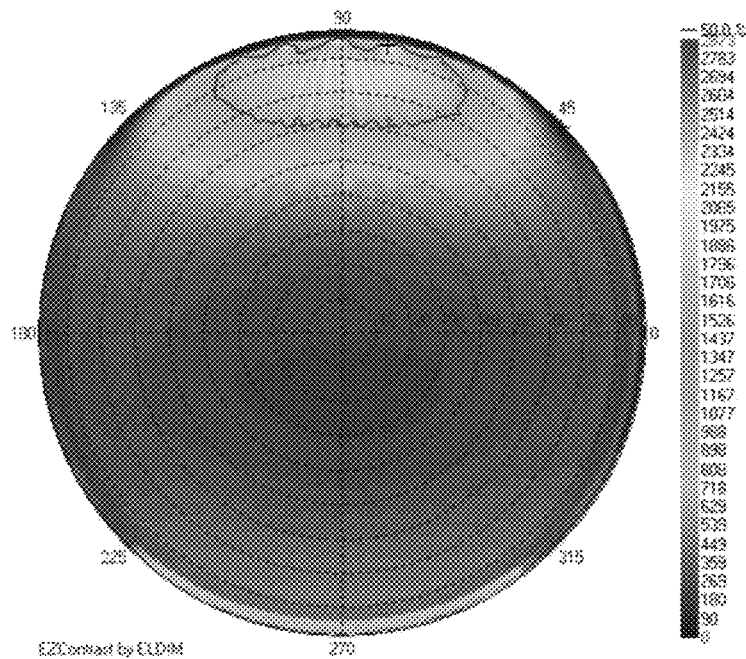
FIGS. 19 to 22 are diagrams showing the results of analysis of viewing angles for a conventional light guide plate (FIG. 19), a combination of a diffusion plate with the light guide plate (FIG. 20), a combination of a diffusion plate and a first light collecting sheet with the light guide plate (FIG. 21), and a combination of a diffusion plate, a first light collecting sheet, and a second light collecting sheet with the light guide plate (FIG. 22)
Figure 20:
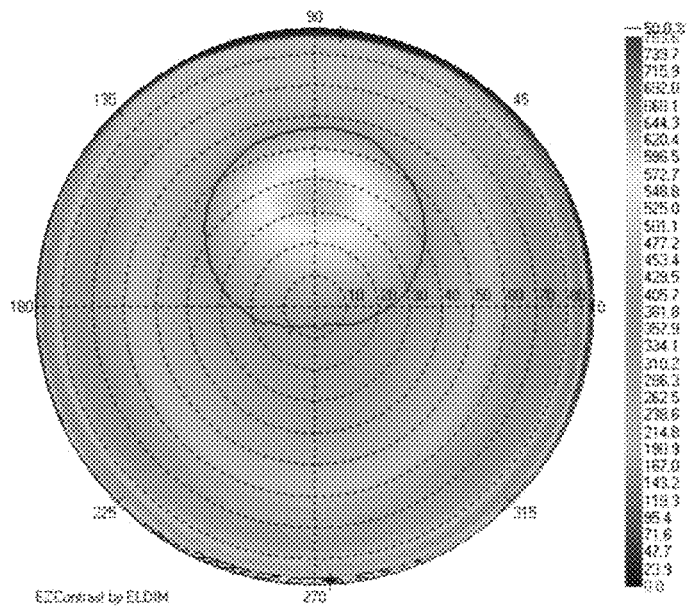
Figure 21:
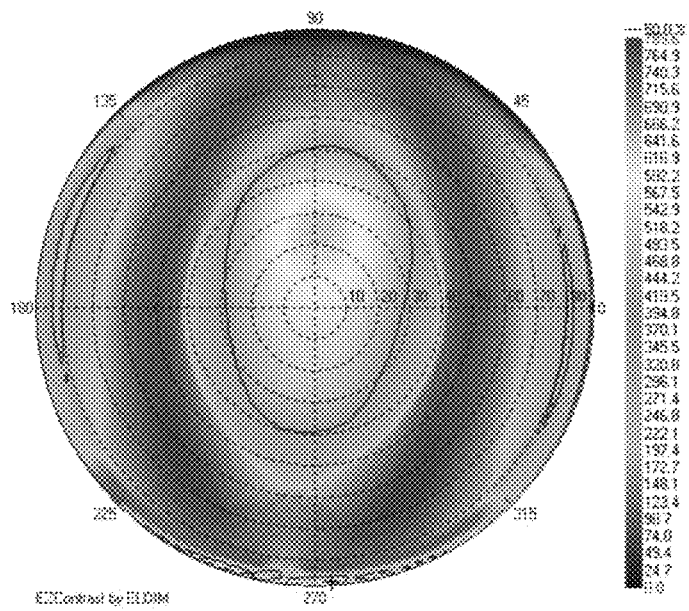
Figure 23:
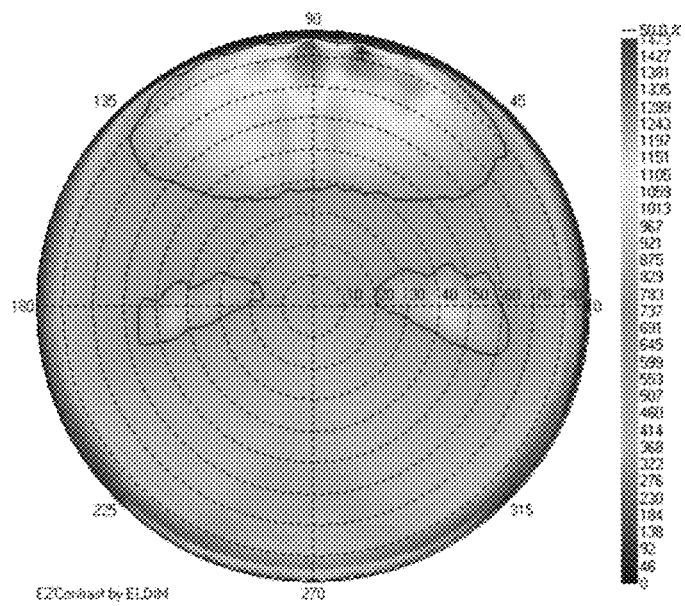
FIGS. 23 and 24 are diagrams showing the results of analysis of viewing angles for a 3-dimensional complex multilayer structure of the present invention as a light guide plate (FIG. 23) and a combination of a diffusion plate with the light guide plate (FIG. 24)
Figure 24:
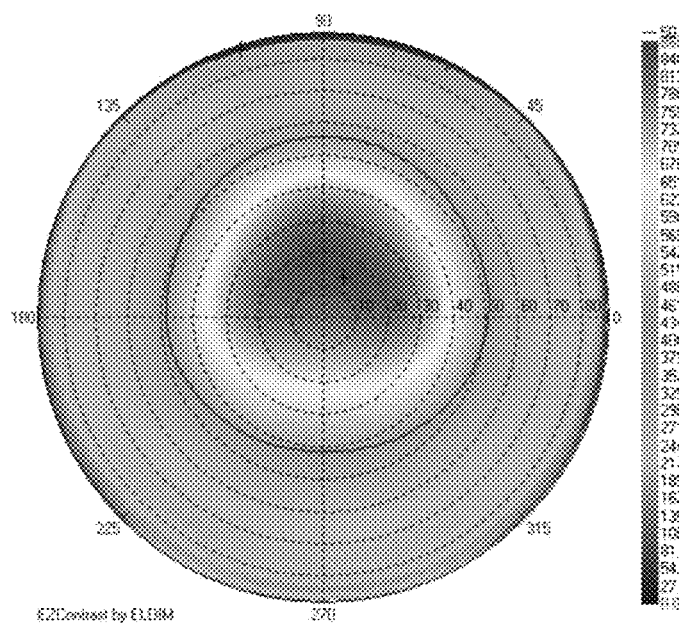

In contrast, a higher luminance was observed in the 3-dimensional complex multilayer structure of the present invention as a light guide plate (FIG. 23) than in the conventional light guide plate (FIG. 19). When a diffusion plate was combined with the 3-dimensional complex multilayer structure of the present invention, the central portion of the combined structure turned red (FIG. 24). These results demonstrate that there is no need for a separate light collecting sheet. Therefore, the use of the 3-dimensional complex multilayer structure according to the present invention is economically desirable and can contribute to a reduction in the thickness of a final device.

Figure 25:
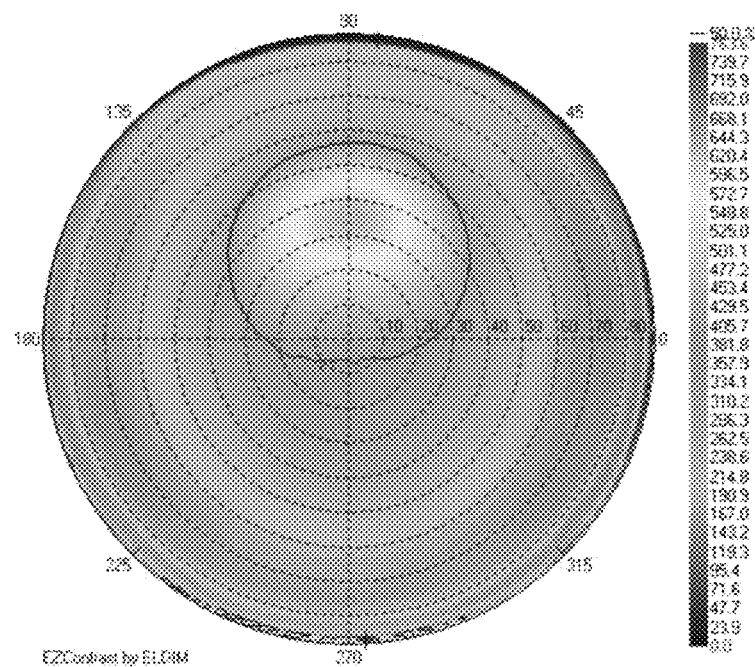
FIG. 25 is a diagram showing the results of analysis of viewing angles for a combination of a diffusion plate with a conventional light guide plate.
Figure 26:
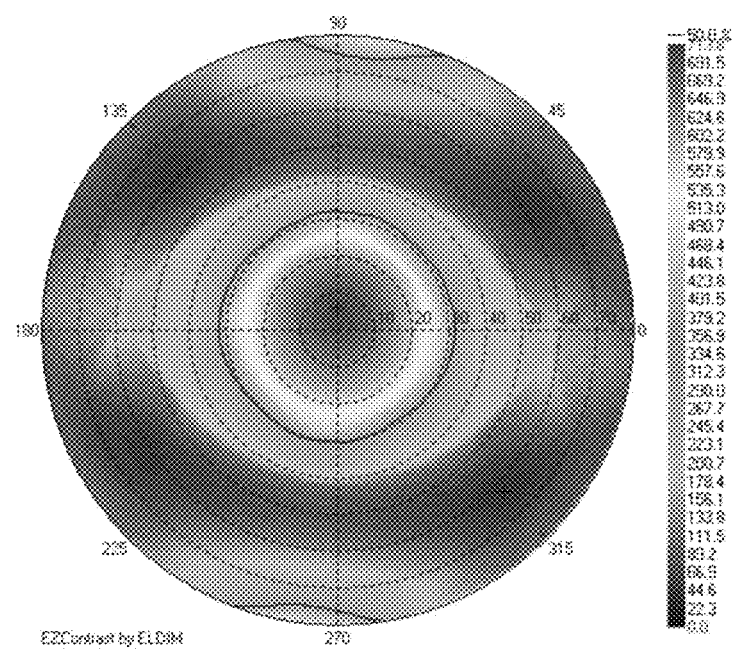
FIG. 26 is a diagram showing the results of analysis of viewing angles for a combination of a diffusion plate, a first light collecting sheet, and a second light collecting sheet with a conventional light guide plate.
Figure 27:
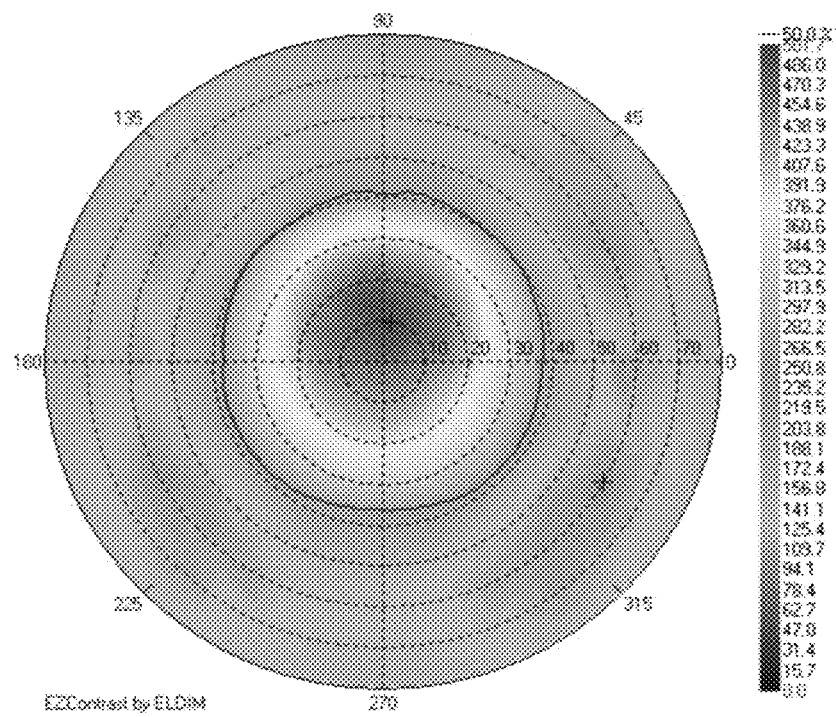
FIG. 27 is a diagram showing the results of analysis of viewing angles for a combination of a 3-dimensional complex multilayer structure of the present invention as an optical sheet with the combination of FIG. 25.

The luminance of a combination of a diffusion plate with a conventional light guide plate is shown in FIG. 25. A combination of the multilayer structure of the present invention as a single optical sheet (FIG. 27) with the combination of FIG. 25 showed a higher luminance as a whole than a combination of two optical sheets with a conventional light guide plate (FIG. 26). In conclusion, a reduced number of optical sheets is required when the multilayer structure of the present invention is used.

While the present invention has been described herein with reference to its preferred embodiments, these embodiments do not serve to limit the invention and those skilled in the art will appreciate that various modifications can be made thereto without departing from the spirit and scope of the present invention. Therefore, the scope of the present invention should be defined by the following claims and their equivalents.

As described above, the 3-dimensional complex multilayer structure of the present invention includes different complex patterns. In contrast, a conventional device has a kind of simple pattern. In addition, the 3-dimensional complex multilayer structure of the present invention can be manufactured by a simple process. Therefore, the 3-dimensional complex multilayer structure of the present invention can find application in various fields, including, but not limited to, optical components for displays (e.g., light guide plates, diffusion plates, prisms, and color filters), next generation displays and display devices (e.g., TFTs, OTFTs, oxide TFTs, flexible displays, and transparent displays), next generation 3-dimensional semiconductors, dry adhesion based on the use of fine ciliary structures, micro/nano piezoelectric devices, lighting optical components, and bio-cell/virus research using micropatterns.

What is claimed is:

1. A 3-dimensional complex multilayer structure comprising a first pattern along a first layer and a second pattern along a second layer formed on one or both surfaces of a plate, the first layer and the second layer having different thicknesses relative to the surface of the plate, wherein the first pattern is selected from the group consisting of parallel lines, parallel curves, parallel zigzag lines, and combinations thereof which do not meet each other, the second pattern is not parallel to the first pattern and is selected from the group consisting of parallel lines, parallel curves, parallel zigzag lines, and combinations thereof which do not meet each other, the interfaces along the plane of the surface between the first pattern and the second pattern form spatially separated figures surrounding regions of the second pattern selected from the group consisting of polygons, circles, ellipses, and combinations thereof wherein at least one of the figures is surrounded along all sides in the plane of the surface by the first pattern, and the figures are repetitively formed on one or both surfaces of the plate; the figures forming a third pattern having a height T through which the first and second patterns are spaced a predetermined height from each other, wherein the first pattern has a height H1 and the second pattern has a height H2, and the height T of third pattern is equal to or higher than the height H1 of the first pattern (T>H1) or the height H2 of the second pattern (T>H2).

2. The 3-dimensional complex multilayer structure according to claim 1, wherein the parallel direction of the first pattern is orthogonal to the parallel direction of the second pattern.

3. The 3-dimensional complex multilayer structure according to claim 1, wherein the first and second patterns are formed using a heat- or active energy ray-curable resin.

4. The 3-dimensional complex multilayer structure according to claim 1, wherein a cross section perpendicular to the parallel directions of the first and second patterns is in the form of a wave, and a pair of adjacent troughs and a crest between the troughs correspond to the three corners of a triangle, both end points of a chord and one point of an arc of a segment of a circle, both end points of a chord and one point of an arc of a segment of an ellipse, or the two corners and one round-edged corner of a triangle in the wavy cross section.

5. The 3-dimensional complex multilayer structure according to claim 4, wherein in the wavy cross section, a pair of adjacent troughs and a crest between the troughs correspond to the three corners of a triangle or the two corners and one round-edged corner of a triangle whose included angle is from 30 to 150°.

6. The 3-dimensional complex multilayer structure according to claim 4, wherein the height from the trough to the crest in the wavy cross section is from 1 to 500 µm.

7. The 3-dimensional complex multilayer structure according to claim 1, wherein the 3-dimensional complex multilayer structure has a refractive index of 1.3 to 1.9.

8. The 3-dimensional complex multilayer structure according to claim 1, wherein the diameter, the longest diameter or the length of one of the sides of each of the repetitively formed figures is from 1 to 5000 µm.

9. The 3-dimensional complex multilayer structure according to-claim 1, wherein the 3-dimensional complex multilayer structure is used in an optical component, a semiconductor device, a piezoelectric device, a biosensor, or a dry adhesive layer.

10. The 3-dimensional complex multi-layer structure according to claim 1, wherein the first pattern extends across the plane of the surface surrounding the second pattern.

* * * * *